United States Patent
Wu et al.

(10) Patent No.: US 10,667,226 B2
(45) Date of Patent: May 26, 2020

(54) FREQUENCY DETERMINING METHOD AND APPARATUS

(71) Applicant: Huawei Technologies Co., Ltd., Shenzhen, Guangdong (CN)

(72) Inventors: Yiling Wu, Beijing (CN); Weiliang Zhang, Beijing (CN); Zheng Liu, Shenzhen (CN); Zhe Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/973,372

(22) Filed: May 7, 2018

(65) Prior Publication Data
US 2018/0255524 A1 Sep. 6, 2018

Related U.S. Application Data

(63) Continuation of application No. PCT/CN2015/094052, filed on Nov. 6, 2015.

(51) Int. Cl.
| | |
|---|---|
| H04W 56/00 | (2009.01) |
| H04L 5/00 | (2006.01) |
| H04W 4/70 | (2018.01) |
| H04W 72/02 | (2009.01) |

(52) U.S. Cl.
CPC ......... *H04W 56/002* (2013.01); *H04L 5/0053* (2013.01); *H04W 4/70* (2018.02); *H04W 56/00* (2013.01); *H04W 72/02* (2013.01)

(58) Field of Classification Search
None
See application file for complete search history.

(56) References Cited

U.S. PATENT DOCUMENTS

| | | | |
|---|---|---|---|
| 8,743,785 B2 * | 6/2014 | Qu | H04W 52/244 370/328 |
| 9,131,432 B2 | 9/2015 | Batchu et al. | |
| 9,451,620 B2 * | 9/2016 | Larsson | H04W 64/00 |

(Continued)

FOREIGN PATENT DOCUMENTS

| | | |
|---|---|---|
| CN | 103428859 A | 12/2013 |
| WO | 2014018333 A2 | 1/2014 |

OTHER PUBLICATIONS

ZTE, "Issues on Carrier Aggregation for Advanced E-UTRA," R1-084111, 3GPP TSG-RAN WG1 #55, Prague, Czech Republic, Nov. 10-14, 2008. 4 pages, XP050317412.

(Continued)

*Primary Examiner* — Kevin D Mew
(74) *Attorney, Agent, or Firm* — Fish & Richardson P.C.

(57) ABSTRACT

The present disclosure relates to the field of mobile communication, and in particular, to frequency determining technologies in the field of wireless communication. In a frequency determining method, a base station determines a frequency according to different modes, so that an interval between the frequency and a channel raster is not greater than a particular threshold. Corresponding frequencies are determined by setting different thresholds. According to the technical solutions provided in this application, user equipment may determine, in different modes, a corresponding frequency resource to communicate with a base station.

15 Claims, 3 Drawing Sheets

A base station determines a first synchronization frequency according to an operating band — 101

The base station sends a signal on the determined frequency — 102

(56) References Cited

U.S. PATENT DOCUMENTS

| | | | |
|---|---|---|---|
| 2005/0075125 A1* | 4/2005 | Bada | H04W 48/20 455/525 |
| 2008/0080463 A1* | 4/2008 | Stewart | H04J 11/0069 370/342 |
| 2009/0232071 A1* | 9/2009 | Cho | H04L 5/0044 370/329 |
| 2009/0303941 A1* | 12/2009 | Naka | H04L 5/023 370/329 |
| 2010/0041338 A1* | 2/2010 | Hannagan | H04L 27/2657 455/62 |
| 2010/0178877 A1* | 7/2010 | Matsumoto | H04L 27/0014 455/71 |
| 2011/0007644 A1* | 1/2011 | Walker | H04B 1/709 370/252 |
| 2011/0045858 A1* | 2/2011 | Zheng | H04J 11/0073 455/507 |
| 2011/0268101 A1* | 11/2011 | Wang | H04L 5/0053 370/344 |
| 2011/0310878 A1* | 12/2011 | Lindoff | H04W 56/0015 370/343 |
| 2012/0270537 A1* | 10/2012 | Weng | H04W 48/16 455/424 |
| 2013/0130724 A1* | 5/2013 | Kumar Reddy | H04W 36/08 455/456.6 |
| 2013/0143502 A1* | 6/2013 | Kazmi | H04W 88/06 455/62 |
| 2013/0195052 A1* | 8/2013 | Ahmadi | H04W 72/0453 370/329 |
| 2013/0230012 A1* | 9/2013 | Lipka | H04W 48/16 370/329 |
| 2013/0250818 A1* | 9/2013 | Gaal | H04W 56/00 370/277 |
| 2013/0301491 A1* | 11/2013 | Bashar | H04W 4/70 370/280 |
| 2014/0169361 A1* | 6/2014 | Kim | H04W 56/0015 370/350 |
| 2014/0211752 A1* | 7/2014 | Berggren | H04L 5/003 370/330 |
| 2014/0254567 A1* | 9/2014 | Han | H04W 76/14 370/336 |
| 2015/0016339 A1* | 1/2015 | You | H04J 11/0073 370/328 |
| 2016/0112898 A1* | 4/2016 | Chen | H04W 28/0215 370/235 |
| 2017/0094621 A1* | 3/2017 | Xu | H04W 56/001 |
| 2018/0006763 A1* | 1/2018 | Kim | H04L 5/0057 |
| 2018/0049113 A1* | 2/2018 | Jung | H04L 5/0048 |
| 2018/0376436 A1* | 12/2018 | Wolff | H04L 5/00 |
| 2019/0013913 A1* | 1/2019 | Suzuki | H04J 11/00 |

OTHER PUBLICATIONS

Nokia Networks, "On retuning time and related Rel-13 MTC issues," R4-1152235, 3GPP TSG-RAN WG4 Meeting #74bis, Rio de Janeiro, Brazil, Apr. 20-24, 2015, 4 pages, XP050939410.

ZTE, "Considerations on Synchronization Signal Design of NB-IoT," R1-155995, 3GPP TSG RAN WG1 Meeting #82bis, Malmö, Sweden, Oct. 5-9, 2015, 4 pages, XP051002764.

"3rd Generation Partnership Project; Technical Specification Group Radio Access Network; Evolved Universal Terrestrial Radio Access (E-UTRA); Base Station (BS) radio transmission and reception (Release 13)", 3GPP TS 36.104 V13.1.0; Sep. 2015; 156 pages.

"3rd Generation Partnership Project; Technical Specification Group Radio Access Network; Evolved Universal Terrestrial Radio Access (E-UTRA); Physical layer procedures (Release 12)"; 3GPP TS 36.213 V12.7.0; Sep. 2015; 241 pages.

"3rd Generation Partnership Project; Technical Specification Group Radio Access Network; Evolved Universal Terrestrial Radio Access (E-UTRA); Radio Resource Control (RRC); Protocol specification (Release 12)"; 3GPP TS 36.331 V12.7.0; Sep. 2015; 453 pages.

"3rd Generation Partnership Project; Technical Specification Group Radio Access Network; Evolved Universal Terrestrial Radio Access (E-UTRA); User Equipment (UE) radio transmission and reception (Release 13)"; 3GPP TS 36.101 V13.1.0; Oct. 2015; 762 pages.

Vodafone; "Updated SID on: Provision of low-cost MTC UEs based on LTE"; TSG RAN meeting #57; RP-121441; Chicago, USA; Sep. 4-7, 2012; 6 pages.

Vodafone Group Plc.; "New Study Item on Cellular System Support for Ultra Low Complexity and Low Throughput Internet of Things"; 3GPP TSG-GERAN Meeting #62; GP-140421; Valencia, Spain; May 26-30, 2014; 6 pages.

Qualcomm Incorporated, "New Work Item: NarrowBand IOT (NB-IOT)"; 3GPP TSG RAN Meeting #69; RP-151621; Phoenix, USA; Sep. 14-16, 2015; 9 pages.

\* cited by examiner

FREQUENCY DETERMINING METHOD AND APPARATUS

CROSS-REFERENCE TO RELATED APPLICATIONS

This application is a continuation of International Application No. PCT/CN2015/094052, filed on Nov. 6, 2015, the disclosure of which is hereby incorporated by reference in its entirety.

TECHNICAL FIELD

The present application relates to the field of communications technologies, and in particular, to a frequency determining method and an apparatus.

BACKGROUND

The Internet of Things (IoT) is the "Internet of connected objects". Clients of the Internet of Things can be any object, and information exchange and communication can be performed therebetween. Such a communication manner is also referred to as machine type communication (MTC), and a communications node thereof is referred to as an MTC terminal. A typical Internet of Things application includes smart metering, smart household, and the like. The Internet of Things needs to be applied to a plurality of scenarios, for example, a plurality of environments such as indoors, outdoors, and underground. Therefore, many special requirements are imposed on a design of the Internet of Things.

First, the Internet of Things needs to have relatively strong coverage performance. Many MTC devices such as an electric meter and a water meter are located in an environment in which coverage is relatively poor. These MTC devices are usually installed in a place where a wireless network signal is very poor, such as a corner of a room or even a basement. In this case, a coverage enhancement technology is required to implement coverage of the Internet of Things.

Second, the Internet of Things needs to support a large quantity of low-rate devices. A quantity of MTC devices needs to be much greater than a quantity of devices used for inter-human communication. However, a data packet transmitted by the MTC device is very small, and the MTC device is insensitive to a delay.

Third, costs of the Internet of Things need to be very low. Many MTC applications require to obtain and use MTC devices at very low costs, so as to deploy the MTC devices in a large scale.

Fourth, an Internet of Things device needs to have a feature of low energy consumption. In most cases, an MTC device is powered by a battery. However, in many scenarios, the MTC device is required to be used for more than ten years without changing the battery. This requires that the MTC device can work at extremely low power consumption.

Until now, the expected objectives of low costs, large coverage, and low energy consumption still cannot be achieved. To satisfy the foregoing special requirements, in a recent NarrowBand Internet of Things (NB-IoT) subject, the following three operation modes are defined:
  (1) Standalone operation: use an independent band, for example, one or more carriers in a Global System for Mobile Communications (GSM) network.
  (2) In-band operation: use one or more physical resource blocks (PRB) in a Long Term Evolution (LTE) carrier.
  (3) Guard-band operation: use a resource block that is not used in a guard band of an LTE carrier.

Due to a limitation on bandwidth and resource allocation in an existing LTE system, when the NB-IoT is deployed in the in-band operation or the guard-band operation, a frequency resource matching an existing raster rule may not be found. Consequently, a base station and UE cannot communicate with each other normally. For example, when the NB-IoT is deployed in the in-band operation, an NB-IoT band and an LTE physical resource block (PRB) need be completely aligned. Due to existence of a downlink direct current subcarrier (DC subcarrier), a non-central LTE physical resource block cannot be found to satisfy the existing LTE raster rule.

SUMMARY

Embodiments of the present disclosure provide a frequency determining method and an apparatus, so that user equipment determines, in different modes, a frequency resource to communicate with a base station.

According to an aspect, an embodiment of this application provides a frequency synchronization method. The method is applied to an NB-IoT system. A base station determines a first synchronization frequency according to an operating band. An interval between the first synchronization frequency and a channel raster is not greater than a first threshold. The base station sends a signal on the determined first synchronization frequency. UE searches a frequency by using an existing LTE raster rule.

In a possible design, in an in-band operation, the first synchronization frequency is one or more center frequencies of indicated PRBs in a set of PRB indices.

In a possible design, the PRB indices, which are natural numbers, are indexed starting from 0 in ascending order, and the PRB indices are indexed in a direction from a low frequency to a high frequency. When the operating band is 3 MHz, the set of the PRB indices includes 2 and 12; or when the operating band is 5 MHz, the set of the PRB indices includes 2, 7, 17, and 12; or when the operating band is 15 MHz, the set of the PRB indices includes 2, 7, 12, 17, 22, 27, 32, 42, 47, 52, 57, 62, 67, and 72. The first threshold is 7.5 kHz.

In a possible design, the PRB indices, which are natural numbers, are indexed starting from 0 in ascending order, and the PRB indices are indexed in a direction from a low frequency to a high frequency. When the operating band is 10 MHz, the set of the PRB indices includes 4, 9, 14, 19, 30, 35, 40, and 45; or when the operating band is 20 MHz, the set of the PRB indices includes 4, 9, 14, 19, 24, 29, 34, 39, 44, 55, 60, 65, 70, 75, 80, 85, 90, and 95. The first threshold is 2.5 kHz.

In a possible design, in a guard-band operation, an interval between the operating band and a guard band is 15 kHz*n, and a value of n is 0, 1, 2, . . . . The first synchronization frequency is one or more indicated center frequencies in a center frequency set.

In a possible design, when the operating band is 5 MHz, the center frequency set includes +2392.5 and −2392.5; or when the operating band is 10 MHz, the center frequency set includes +4597.5, +4702.5, +4807.5, +4897.5, −4597.5, −4702.5, −4807.5, and −4897.5; or when the operating band is 15 MHz, the center frequency set includes +6892.5, +6997.5, +7102.5, +7207.5, +7297.5, +7402.5, −6892.5, −6997.5, −7102.5, −7207.5, −7297.5, and −7402.5; or when the operating band is 20 MHz, the center frequency set includes +9097.5, +9202.5, +9307.5, +9397.5, +9502.5, +9607.5, +9697.5, +9802.5, +9907.5, −9097.5, −9202.5, −9307.5, −9397.5, −9502.5, −9607.5, −9697.5, −9802.5, and −9907.5.

In a possible design, the base station sends an LTE system bandwidth to UE in the NB-IoT system.

According to another aspect, an embodiment of this application provides another frequency synchronization method. The method is applied to an NB-IoT system. UE determines a first synchronization frequency according to an operating band. The UE synchronizes with a base station on the determined first synchronization frequency.

According to another aspect, an embodiment of this application provides another frequency synchronization method. The method is applied to an NB-IoT system. A base station determines a first synchronization frequency according to an operating band. The base station sends a signal to UE on the determined first synchronization frequency.

In a possible design, in an in-band operation, the first synchronization frequency is determined in the following manner:

$$\begin{cases} \text{if } BW = 3 \text{ MHz, 5 MHz, 15 MH,} \\ f_{NB-IoT} = 100n \pm (180m + 7.5) \text{ kHz}, m = 4, 5, 6, \ldots \\ \text{if } BW = 10 \text{ MHz, 20 MHz,} \\ f_{NB-IoT} = 100n \pm (180m + 97.5) \text{ kHz}, m = 3, 4, 5, \ldots \end{cases}$$

where $$f_{min} + \frac{BW}{2} \leq 100n \leq f_{max} - \frac{BW}{2}, n \in N,$$

$$m \leq \left\lfloor \frac{N_{RB}}{2} \right\rfloor,$$

$f_{min}$ and $f_{max}$ are determined by an operating band on which the UE operates, and BW is an LTE system bandwidth.

In a possible design, in an guard-band operation, the first synchronization frequency is determined in the following manner:

$$f_{NB-IoT} = 100n \pm (90N_{RB} + 97.5 + \Delta) \text{kHz}$$

where $$f_{min} + \frac{BW}{2} \leq 100n \leq f_{max} - \frac{BW}{2},$$

$n \in N$, $f_{min}$ and $f_{max}$ are determined by an operating band on which the UE operates, and BW is an LTE system bandwidth.

According to another aspect, an embodiment of the present disclosure provides a base station. The base station has functions of implementing behaviors of the base station in the foregoing methods. The functions may be implemented by using hardware, or may be implemented by hardware executing corresponding software. The hardware or software includes one or more modules corresponding to the foregoing functions.

In a possible design, a structure of the base station includes a processor and a transmitter. The processor is configured to support the base station to execute a corresponding function in the foregoing methods. The transmitter is configured to: support communication between the base station and UE, and send, to the UE, information or an instruction related to the foregoing methods. The base station may further include a memory. The memory is configured to be coupled to the processor. The memory stores a program instruction and data that are necessary for the base station.

According to still another aspect, an embodiment of the present disclosure provides UE. The UE has functions of implementing behaviors of the UE in the foregoing methods. The functions may be implemented by using hardware, or may be implemented by hardware executing corresponding software. The hardware or software includes one or more modules corresponding to the foregoing functions. The modules may be software and/or hardware.

In a possible design, a structure of the UE includes a receiver and a processor. The receiver is configured to: support the UE to receive a first DRX long cycle and a second DRX long cycle that are configured by the foregoing base station for the UE, and various instructions such as a DRX activation indication or a DRX deactivation indication. The processor controls the UE to receive a paging message according to the first DRX long cycle, the DRX deactivation indication, or the second DRX long cycle received by the receiver.

Compared with the prior art, the solutions provided in the present disclosure may implement that the user equipment communicates, in different modes, with the base station on the determined frequency.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

In this application, the terms "network" and "system" are often used alternately, but persons skilled in the art may understand the meanings thereof. User equipment UE in this application may include various handheld devices having a wireless communication function, vehicular devices, wearable devices, computing devices, or other processing devices connected to a wireless modem, and various forms of user equipment (UE), mobile stations (MS), terminals, terminal equipment, and the like. For ease of description, in this application, the devices mentioned above are all referred to as user equipment or UE. A base station (BS) in the present disclosure is an apparatus that is deployed in a radio access network and that is configured to provide a wireless communication function for UE. The base station may include various forms of macro base stations, micro base stations, relay stations, access points, and the like. In systems using different wireless access technologies, names of devices having a base station function may be different. For example, a device having a base station function is referred to as an evolved NodeB (eNB or eNodeB) in an LTE network, or is referred to as a NodeB in a third-generation 3G network. For ease of description, in this application, the foregoing apparatuses providing the wireless communication function for the UE are all referred to as a base station or a BS.

Figure 1:
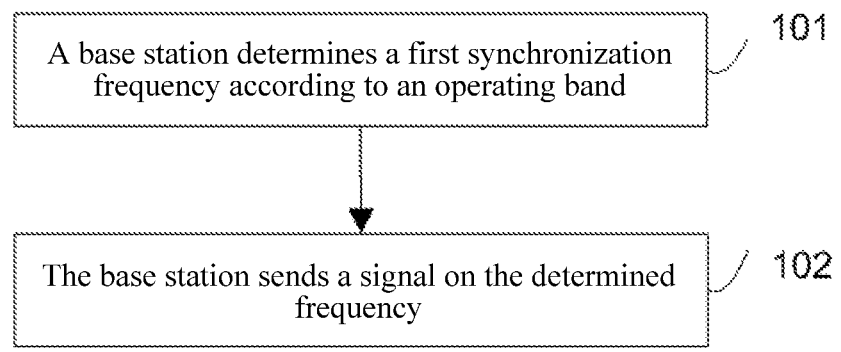
FIG. 1 is a possible schematic flowchart of determining a frequency according to an embodiment of the present disclosure.

FIG. 1 is a flowchart of determining a frequency according to an embodiment of the present disclosure. An implementation of the present disclosure is described in detail below with reference to FIG. 1.

S101. A base station determines a first synchronization frequency according to an operating band. An interval between the first synchronization frequency and a channel raster is not greater than a first threshold.

S102. The base station sends a signal on the determined first synchronization frequency.

In an in-band operation, different frequencies are determined for different operating bandwidths, for example, LTE system bandwidths.

As shown in Table 1, for operating bandwidths that are LTE system bandwidths 3 MHz, 5 MHz, and 15 MHz, it is determined that a minimum interval between a frequency that is a center frequency of a PRB indicated by a PRB index and a closest channel raster is 7.5 kHz. For LTE system bandwidths 10 MHz and 20 MHz, it is determined that a minimum interval between a frequency that is a center frequency of a PRB indicated by a PRB index and a closest channel raster is 2.5 kHz.

TABLE 1

| | LTE system bandwidth | | | | |
|---|---|---|---|---|---|
| | 3 MHz | 5 MHz | 10 MHz | 15 MHz | 20 MHz |
| PRB indices with 2.5 kHz offset | / | / | 4, 9, 14, 19, 30, 35, 40, 45 | / | 4, 9, 14, 19, 24, 29, 34, 39, 44, 55, 60, 65, 70 75, 80, 85, 90, 95 |
| PRB indices with 7.5 kHz offset | 2, 12 | 2, 7, 17, 22 | / | 2, 7, 12, 17, 22, 27, 32, 42, 47, 52, 57, 62, 67, 72 | / |

For an NB-IoT system, a 100 kHz channel raster is still used, but a maximum frequency offset of 7.5 kHz is allowed. In a case of in-band deployment, a network side may deploy, according to a size of an LTE system bandwidth, the NB-IoT system on a center frequency indicted by a PRB index shown in Table 1.

During specific implementation, the PRB indices, which are natural numbers, are indexed starting from 0 in ascending order, and the PRB indices are indexed in a direction from a low frequency to a high frequency.

When the frequency offset is 7.5 kHz, for different LTE system bandwidths, center frequencies corresponding to different PRB indices satisfying a condition exist, so that UE in the NB-IoT system may synchronize with a network. The PRB indices are as follows:

when the operating band is 3 MHz, the PRB indices satisfying the condition include 2 and 12; or when the operating band is 5 MHz, the PRB indices satisfying the condition include 2, 7, 17, and 12; or when the operating band is 15 MHz, the PRB indices satisfying the condition include 2, 7, 12, 17, 22, 27, 32, 42, 47, 52, 57, 62, 67, and 72.

When the frequency offset is 2.5 kHz, for different LTE system bandwidths, center frequencies corresponding to different PRB indices satisfying a condition exist, so that UE in the NB-IoT system may synchronize with a network. The PRB indices are as follows:

when the operating band is 10 MHz, the PRB indices satisfying the condition include 4, 9, 14, 19, 30, 35, 40, and 45; or when the operating band is 20 MHz, the PRB indices satisfying the condition include 4, 9, 14, 19, 24, 29, 34, 39, 44, 55, 60, 65, 70, 75, 80, 85, 90, and 95.

In a guard-band operation, due to existence of an LTE downlink direct current subcarrier, to maintain orthogonality between the NB-IoT and the LTE subcarrier, an integer multiple of 15 kHz is required for edge-to-edge frequency separation of a transmission bandwidth of the NB-IoT and an LTE transmission bandwidth. In this case, a minimum frequency interval that can be reached by the NB-IoT and that is to a closest 100 kHz raster is 2.5 kHz or 7.5 kHz, and depends on the LTE system bandwidths.

As shown in Table 2, in the guard-band operation, different frequencies are determined for different operating bandwidths, for example, LTE system bandwidths.

TABLE 2

| | LTE system bandwidth | | | |
|---|---|---|---|---|
| | 5 MHz | 10 MHz | 15 MHz | 20 MHz |
| Edge frequency of LTE transmission (kHz) | ±2257.5 | ±4507.5 | ±6757.5 | ±9007.5 |
| NB-IoT carrier center frequency closest to 100 kHz channel raster (kHz) | ±2392.5 | ±4597.5/ 4702.5/ 4807.5/4897.5 | ±6892.5/ 6997.5/ 7102.5/7207.5/ 7297.5/7402.5 | ±9097.5/ 9202.5/9307.5/ 9397.5/9502.5/9607.5/ 9697.5/9802.5/9907.5 |

TABLE 2-continued

| | LTE system bandwidth | | | |
|---|---|---|---|---|
| | 5 MHz | 10 MHz | 15 MHz | 20 MHz |
| Frequency offset from the 100 kHz channel raster (kHz) | 7.5 | 2.5/−2.5/−7.5/2.5 | 7.5/2.5/−2.5/−7.5/2.5/7.5 | 2.5/−2.5/−7.5/2.5/−2.5/−7.5/2.5/−2.5/−7.5/2.5 |
| Edge-to-edge separation of LTE and NB-IoT (kHz) | 45 | 0/105/210/300 | 45/150/255/360/450/555 | 0/105/210/300/405/510/600/705/810 |

An interval between a guard bandwidth and a transmission bandwidth of the LTE system is 15 kHz*n, and a value of n is 0, 1, 2, . . . . An allowed maximum frequency offset is 7.5 kHz. Corresponding frequencies are determined for different operating bandwidths, so that UE in the NB-IoT system may synchronize with a network.

when the operating band is 5 MHz, the center frequency set includes +2392.5 and −2392.5; or when the operating band is 10 MHz, the center frequency set includes +4597.5, +4702.5, +4807.5, +4897.5, −4597.5, −4702.5, −4807.5, and −4897.5; or when the operating band is 15 MHz, the center frequency set includes +6892.5, +6997.5, +7102.5, +7207.5, +7297.5, +7402.5, −6892.5, −6997.5, −7102.5, −7207.5, −7297.5, and −7402.5; or when the operating band is 20 MHz, the center frequency set includes +9097.5, +9202.5, +9307.5, +9397.5, +9502.5, +9607.5, +9697.5, +9802.5, +9907.5, −9097.5, −9202.5, −9307.5, −9397.5, −9502.5, −9607.5, −9697.5, −9802.5, and −9907.5.

After the frequency is determined, the base station sends an LTE system bandwidth to the UE in the NB-IoT system.

Figure 2:
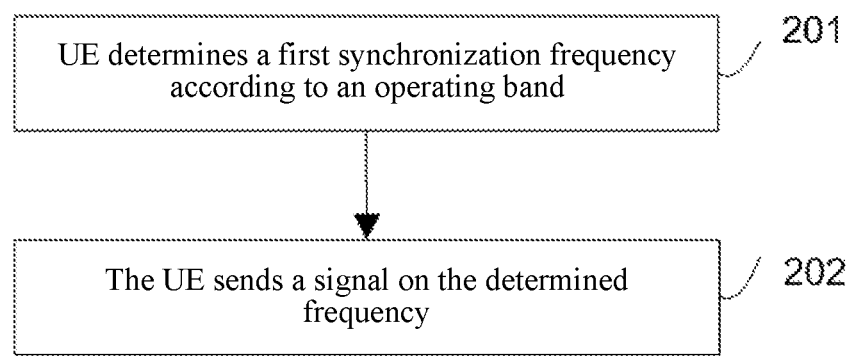
FIG. 2 is another possible schematic flowchart of determining a frequency according to an embodiment of the present disclosure.

FIG. 2 is another flowchart of determining a frequency according to an embodiment of the present disclosure. An implementation of the present disclosure is described in detail below with reference to FIG. 2.

S201. UE determines a first synchronization frequency according to an operating band.

S202. The UE synchronizes with a base station on the determined first synchronization frequency.

An existing system raster and an NB-IoT system frequency do not match. Therefore, a raster of the NB-IoT is redefined in this embodiment, and deployment of the NB-IoT and synchronization search for the UE are not performed strictly by using a search raster in the existing LTE/UMTS/GSM. A distinctive raster of the NB-IoT is defined according to an operating band, for example, downlink 2110 MHz to 2170 MHz is Band1 thereof. A network side deploys the NB-IoT according to the distinctive raster of the NB-IoT on the operating band, that is, a center frequency of the NB-IoT falls on the raster. The UE performs synchronization search according to the distinctive raster.

In a case of in-band deployment, a raster frequency of the NB-IoT may be determined in the following manner:

$$\begin{cases} \text{if } BW = 3 \text{ MHz}, 5 \text{ MHz}, 15 \text{ MH}, \\ f_{NB-IoT} = 100n \pm (180m + 7.5) \text{ kHz}, m = 4, 5, 6, \ldots \\ \text{if } BW = 10 \text{ MHz}, 20 \text{ MHz}, \\ f_{NB-IoT} = 100n \pm (180m + 97.5) \text{ kHz}, m = 3, 4, 5, \ldots \end{cases}$$

-continued $$f_{min} + \frac{BW}{2} \le 100n \le f_{max} - \frac{BW}{2}, n \in N,$$

$$m \le \left\lfloor \frac{N_{RB}}{2} \right\rfloor,$$

and $f_{min}$ and $f_{max}$ are determined by an operating band on which the UE operates. For example, for Band1 (2110 MHz to 2170 MHz) defined in 36.101, $f_{min}$=2110 MHz, and $f_{max}$=2170 MHz. BW is a possible LTE system bandwidth on the operating band, for example, 5 MHz, 10 MHz, 15 MHz, or 20 MHz. An $N_{RB}$ is determined according to Table 3.

TABLE 3

PRB quantities for different LTE system bandwidths

| | Channel bandwidth $BW_{channel}$ [MHz] | | | | |
|---|---|---|---|---|---|
| | 3 | 5 | 10 | 15 | 20 |
| Transmission bandwidth configuration $N_{RB}$ | 15 | 25 | 50 | 75 | 100 |

When deployed on a guard band of the LTE, a distinctive raster frequency of the NB-IoT may be determined in the following manner:

$$f_{NB-IoT} = 100n \pm (90N_{RB} + 9.75 + \Delta) \text{ kHz}$$

$$f_{min} + \frac{BW}{2} \le 100n \le f_{max} - \frac{BW}{2}, n \in N$$

needs to be satisfied. $f_{min}$ and $f_{max}$ are determined by an operating band on which the UE operates. For example, for Band1 (2110 MHz to 2170 MHz) defined in 36.101, $f_{min}$=2110 MHz, and $f_{max}$=2170 MHz. BW is a possible LTE system bandwidth on the operating band, for example, 5 MHz, 10 MHz, 15 MHz, or 20 MHz. An $N_{RB}$ is determined according to Table 3. A value of $\Delta$ is determined according to Table 4.

TABLE 4

Edge-to-edge frequency interval between the NB-IoT and the LTE

| | LTE system bandwidth | | | |
|---|---|---|---|---|
| | 5 MHz | 10 MHz | 15 MHz | 20 MHz |
| Edge-to-edge distance of LTE and NB-IoT Δ (kHz) | 45 | 0 | 45 | 0 |

A frequency subset defined in the foregoing descriptions may be used as the distinctive raster of the NB-IoT, so as to simplify a search process of the UE of the NB-IoT.

Optionally, the base station may also determine the first synchronization frequency. A determining manner is similar to a determining manner of the UE, and details are not described herein. After determining the frequency, the base station communicates with the UE on the frequency.

Figure 3:
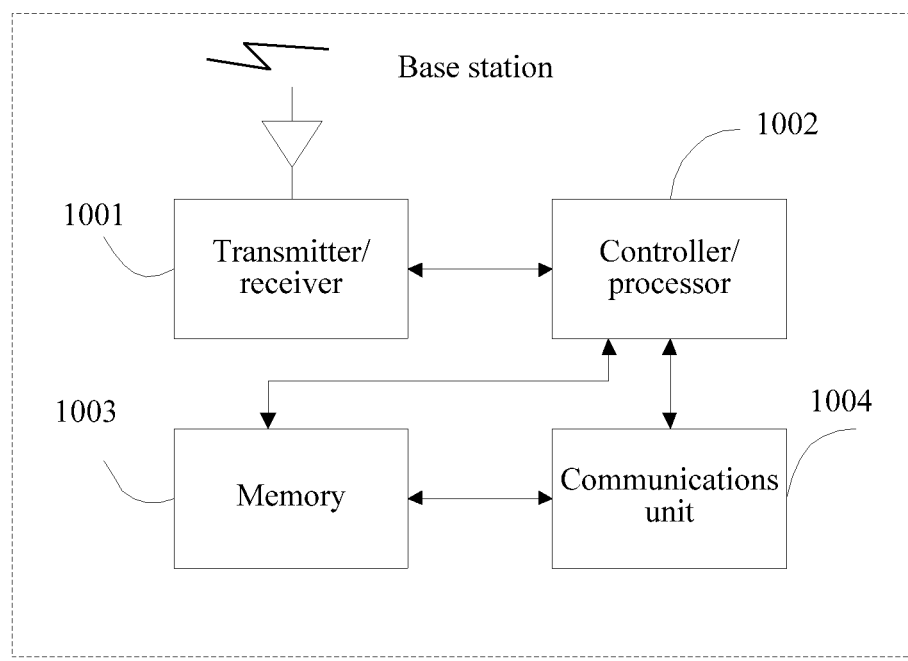
FIG. 3 is a schematic structural diagram of a base station according to an embodiment of the present disclosure.

FIG. 3 is a possible schematic structural diagram of the base station in the foregoing embodiments.

The base station includes a transmitter/receiver 1001, a controller/processor 1002, a memory 1003, and a communications unit 1004. The transmitter/receiver 1001 is configured to: support the base station to receive information from and send information to the UE in the foregoing embodiments, and support the UE to perform radio communication with another UE. The controller/processor 1002 executes various functions for communicating with the UE. On an uplink, an uplink signal from the UE is received by using an antenna, is modulated by the receiver 1001, and is further processed by the controller/processor 1002, so as to recover service data and signaling message that are sent by the UE. On a downlink, service data and a signaling message are processed by the controller/processor 1002, is modulated by the transmitter 1001 to generate a downlink signal, and then the downlink signal is transmitted to the UE by using the antenna. The controller/processor 1002 also performs a processing process of the base station in the embodiments of the present disclosure and/or is used for another process of the technology described in this application. The memory 1003 is configured to store program code and data of the base station. The communications unit 1004 is configured to support the base station to communicate with another network entity, for example, is configured to support the base station to communicate with another communications network entity shown in FIG. 2, for example, an MME, an SGW, or a PGW in a core network EPC.

It may be understood that FIG. 3 shows merely a simplified design of the base station. In an actual application, the base station may include any quantity of transmitters, receivers, processors, controllers, memories, communications units, and the like, and all base stations that can implement the present disclosure shall fall within the protection scope of the present disclosure.

Figure 4:
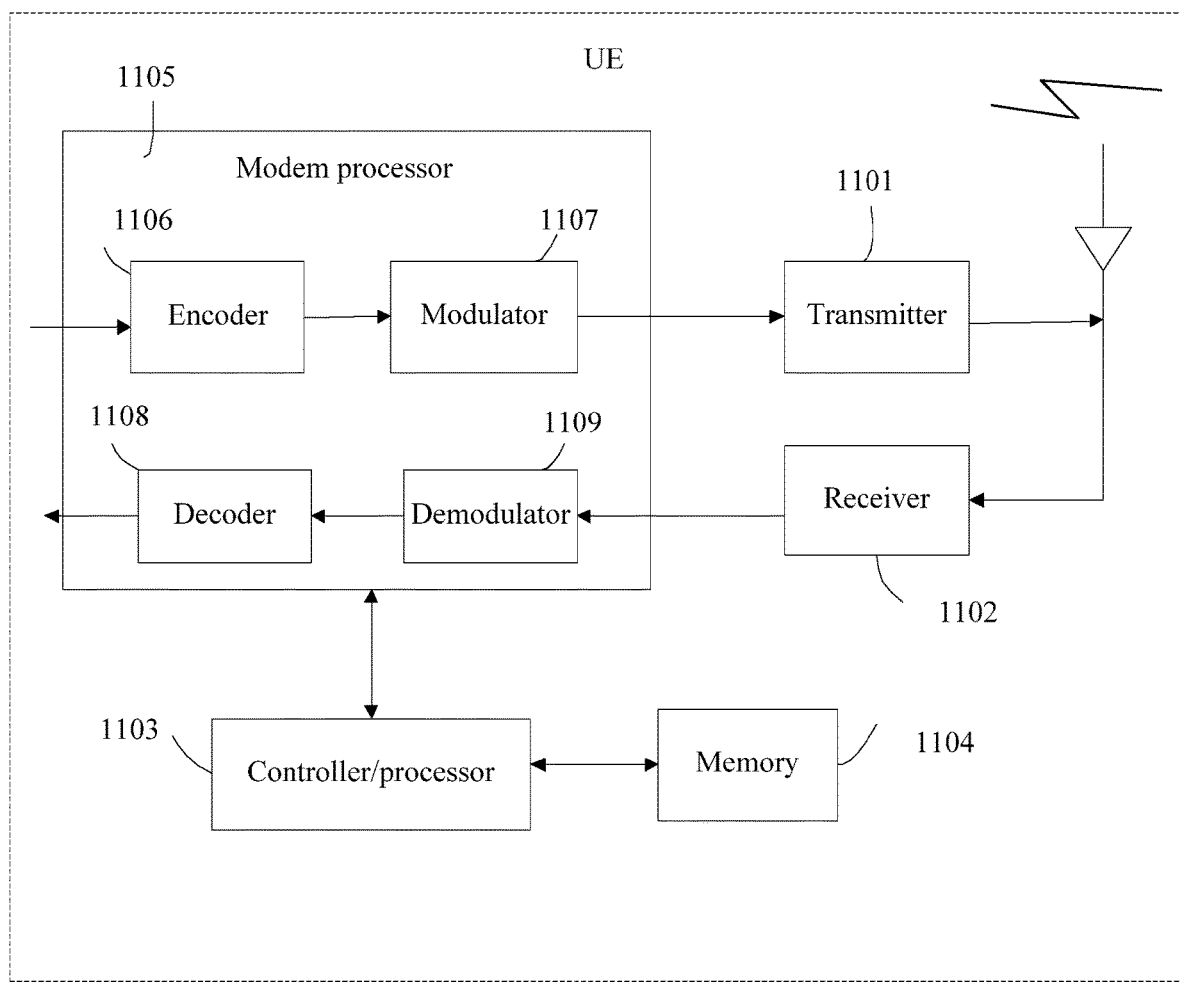
FIG. 4 is a schematic structural diagram of UE according to an embodiment of the present disclosure.

FIG. 4 is a simplified schematic diagram of a possible design structure of the UE in the foregoing embodiments. The UE includes a transmitter 1101, a receiver 1102, a controller/processor 1103, a memory 1104, and a modem processor 1105.

The transmitter 1101 modulates (for example, analog-to-digital conversion, filtering, amplification, and up-conversion) output sampling and generates an uplink signal. The uplink signal is transmitted to the base station in the foregoing embodiments by using an antenna. On a downlink, the antenna receives a downlink signal transmitted by the base station in the foregoing embodiments. The receiver 1102 modulates (for example, filtering, amplification, down-conversion, and digitization) a signal received by using the antenna and provides input sampling. In the modem processor 1105, an encoder 1106 receives service data and a signaling message that are to be sent on an uplink, and processes (for example, formatting, encoding, and interleaving) the service data and the signaling message. A modulator 1107 further processes (for example, symbol mapping and modulation) the encoded service data and signaling message and provides output sampling. A demodulator 1109 processes (for example, demodulation) the input sampling and provides symbol estimation. A decoder 1108 processes (for example, de-interleaving and decoding) the symbol estimation and provides the decoded data and signaling message that are to be sent to the UE. The encoder 1106, the modulator 1107, the demodulator 1109, and the decoder 1108 may be implemented by the synthetic modem processor 1105. These units perform processing according to a wireless access technology (for example, access technologies in an LTE system and other evolved systems) used in a radio access network.

The method and the apparatus are based on a same inventive idea. The method and the apparatus have similar principles for resolving problems. Therefore, for implementations of the apparatus and the method, refer to each other, and details of repeated parts are not described again.

According to still another aspect, an embodiment of the present disclosure provides a communications system. The system includes the base station and the UE according to the foregoing aspects; or the system includes the base station and the network entity according to the foregoing aspects; or the system includes the base station, the UE, and the network entity according to the foregoing aspects.

According to yet another aspect, an embodiment of the present disclosure provides a computer storage medium, configured to store a computer software instruction used by the foregoing base station. The computer storage medium includes a program designed for executing the foregoing aspects.

It should be noted that the module division in the embodiments of the present disclosure is an example, and is merely logical function division. There may be another division manner in an actual implementation. In addition, functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes various media that can store program code, such as a USB flash drive, a removable hard disk, a read-only memory (ROM), a random-access memory (RAM,), a magnetic disk, or an optical disc.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the scope of the embodiments of the present disclosure. The present disclosure is intended to cover these modifications and variations provided that they fall within the scope of protection defined by the following claims and their equivalent technologies.

What is claimed is:

1. A frequency synchronization method, applied to a narrow band Internet of Things (NB-IoT) system, the method comprising:
determining, by a base station, a first synchronization frequency according to an operating band, wherein an interval between the first synchronization frequency and a channel raster is not greater than a first threshold; and
sending, by the base station, a signal on the determined first synchronization frequency;
wherein in an in-band operation, the first synchronization frequency is one or more center frequencies of indicated physical resource blocks (PRBs) in a set of PRB indices,
wherein the PRB indices are natural numbers and indexed starting from 0 in ascending order, and the PRB indices are indexed in a direction from a low frequency to a high frequency, and
wherein when the operating band is 3 MHz, the set of the PRB indices comprises 2 and 12, or when the operating band is 5 MHz, the set of the PRB indices comprises 2, 7, 17, and 22, or when the operating band is 15 MHz, the set of the PRB indices comprises 2, 7, 12, 17, 22, 27, 32, 42, 47, 52, 57, 62, 67, and 72.

2. The method according to claim 1, wherein the first threshold is 7.5 kHz.

3. The method according to claim 1, wherein:
the PRB indices are natural numbers and indexed starting from 0 in ascending order, and the PRB indices are indexed in a direction from a low frequency to a high frequency; and
when the operating band is 10 MHz, the set of the PRB indices comprises 4, 9, 14, 19, 30, 35, 40, and 45, or when the operating band is 20 MHz, the set of the PRB indices comprises 4, 9, 14, 19, 24, 29, 34, 39, 44, 55, 60, 65, 70, 75, 80, 85, 90, and 95.

4. The method according to claim 3, wherein the first threshold is 2.5 kHz.

5. The method according to claim 1, wherein:
in a guard-band operation, an interval between the operating band and a guard band is 15 kHz*n, and a value of n is 0, 1, 2, . . . ; and
the first synchronization frequency is one or more indicated center frequencies in a center frequency set.

6. The method according to claim 5, wherein:
when the operating band is 5 MHz, the center frequency set comprises +2392.5 and −2392.5; or
when the operating band is 10 MHz, the center frequency set comprises +4597.5, +4702.5, +4807.5, +4897.5, −4597.5, −4702.5, −4807.5, and −4897.5; or
when the operating band is 15 MHz, the center frequency set comprises +6892.5, +6997.5, +7102.5, +7207.5, +7297.5, +7402.5, −6892.5, −6997.5, −7102.5, −7207.5, −7297.5, and −7402.5; or
when the operating band is 20 MHz, the center frequency set comprises +9097.5, +9202.5, +9307.5, +9397.5, +9502.5, +9607.5, +9697.5, +9802.5, +9907.5, −9097.5, −9202.5, −9307.5, −9397.5, −9502.5, −9607.5, −9697.5, −9802.5, and −9907.5.

7. The method according to claim 1, further comprising:
sending, by the base station, an LTE system bandwidth to user equipment (UE) in the NB-IoT system.

8. A base station, applied to a narrowband Internet of Things (NB-IoT) system, the base station comprising:
a processor, configured to determine a first synchronization frequency according to an operating band, wherein an interval between the first synchronization frequency and a channel raster is not greater than a first threshold; and
a transmitter, configured to send a signal on the determined first synchronization frequency, wherein in an in-band operation, the processor is configured to determine that the first synchronization frequency is one or more center frequencies of indicated physical resource blocks (PRBs) in a set of PRB indices,
wherein the processor is configured to index the PRB indices, which are natural numbers, starting from 0 in ascending order, and a direction of the PRB indices is from a low frequency to a high frequency, and
wherein when the operating band is 3 MHz, the set of the PRB indices comprises 2 and 12, or when the operating band is 5 MHz, the set of the PRB indices comprises 2, 7, 17, and 22, or when the operating band is 15 MHz, the set of the PRB indices comprises 2, 7, 12, 17, 22, 27, 32, 42, 47, 52, 57, 62, 67, and 72.

9. The base station according to claim 8, wherein the first threshold is 7.5 kHz.

10. The base station according to claim 8, wherein:
the processor is configured to index the PRB indices, which are natural numbers, starting from 0 in ascending order, and a direction of the PRB indices is from a low frequency to a high frequency;
when the operating band is 10 MHz, the set of the PRB indices comprises 4, 9, 14, 19, 30, 35, 40, and 45, or when the operating band is 20 MHz, the set of the PRB indices comprises 4, 9, 14, 19, 24, 29, 34, 39, 44, 55, 60, 65, 70, 75, 80, 85, 90, and 95; and
the first threshold is 2.5 kHz.

11. The base station according to claim 8, wherein:
in a guard-band operation, an interval between the operating band and a guard band is 15 kHz*n, and a value of n is 0, 1, 2, . . . ; and
the processor is configured to determine that the first synchronization frequency is one or more indicated center frequencies in a center frequency set.

12. The base station according to claim 11, wherein:
when the operating band is 5 MHz, the center frequency set comprises +2392.5 and −2392.5; or
when the operating band is 10 MHz, the center frequency set comprises +4597.5, +4702.5, +4807.5, +4897.5, −4597.5, −4702.5, −4807.5, and −4897.5; or
when the operating band is 15 MHz, the center frequency set comprises +6892.5, +6997.5, +7102.5, +7207.5, +7297.5, +7402.5, −6892.5, −6997.5, −7102.5, −7207.5, −7297.5, and −7402.5; or
when the operating band is 20 MHz, the center frequency set comprises +9097.5, +9202.5, +9307.5, +9397.5, +9502.5, +9607.5, +9697.5, +9802.5, +9907.5, −9097.5, −9202.5, −9307.5, −9397.5, −9502.5, −9607.5, −9697.5, −9802.5, and −9907.5.

13. The base station according to claim 8, wherein the transmitter is further configured to send an LTE system bandwidth to user equipment (UE) in the NB-IoT system.

14. User equipment (UE), applied to a narrowband Internet of Things (NB-IoT) system, the UE comprising:

a processor, configured to determine a first synchronization frequency according to an operating band; and
a transmitter, configured to synchronize with a base station on the determined first synchronization frequency;
wherein in an in-band operation, the processor is configured to determine the first synchronization frequency in the following manner:

$$\begin{cases} \text{if } BW = 3 \text{ MHz, 5 MHz, 15 MH,} \\ f_{NB-IoT} = 100n \pm (180m + 7.5) \text{ kHz}, m = 4, 5, 6, \ldots \\ \text{if } BW = 10 \text{ MHz, 20 MHz,} \\ f_{NB-IoT} = 100n \pm (180m + 97.5) \text{ kHz}, m = 3, 4, 5, \ldots \end{cases}$$

wherein $$f_{min} + \frac{BW}{2} \le 100n \le f_{max} - \frac{BW}{2}, n \in N,$$

$$m \le \left\lfloor \frac{N_{RB}}{2} \right\rfloor,$$

$f_{min}$ and $f_{max}$ are determined by an operating band on which the UE operates, and BW is the operating band, wherein n is a natural number, wherein N is a natural number set, wherein $N_{RB}$ represents a number of resource blocks corresponding to the operating band, wherein $f_{NB-IoT}$ is a raster frequency of the NB-IoT system, wherein $f_{min}$ is a minimum frequency of the operating band, and wherein $f_{max}$ is a maximum frequency of the operating band.

15. The UE according to claim 14, wherein in a guard-band operation, the processor is configured to determine the first synchronization frequency in the following manner:

$f_{NB-IoT}=100n\pm(90N_{RB}+97.5+\Delta)\text{kHz}$ wherein $$f_{min} + \frac{BW}{2} \le 100n \le f_{max} - \frac{BW}{2}, n \in N,$$

$f_{min}$ and $f_{max}$ are determined by an operating band on which the UE operates, and BW is an LTE system bandwidth, wherein n is a natural number, wherein N is a natural number set, wherein $\Delta$ is an edge-to-edge distance of a long time evolution (LTE) system and the NB-IoT system, wherein $N_{RB}$ represents a number of resource blocks corresponding to the operating band, wherein $f_{NB-IoT}$ is a raster frequency of the NB-IoT system, wherein $f_{min}$ is a minimum frequency of the operating band, and wherein $f_{max}$ is a maximum frequency of the operating band.

* * * * *